United States Patent
Li

(10) Patent No.: US 10,715,251 B2
(45) Date of Patent: Jul. 14, 2020

(54) FREE-SPACE OPTICAL COMMUNICATIONS USING FEW-MODE PRE-AMPLIFIED RECEIVERS

(71) Applicant: University of Central Florida Research Foundation, Inc., Orlando, FL (US)

(72) Inventor: Guifang Li, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 16/118,020

(22) Filed: Aug. 30, 2018

(65) Prior Publication Data

US 2019/0074898 A1    Mar. 7, 2019

Related U.S. Application Data

(60) Provisional application No. 62/553,402, filed on Sep. 1, 2017.

(51) Int. Cl.
| | | |
|---|---|---|
| *H04B 10/112* | (2013.01) | |
| *H04B 10/11* | (2013.01) | |
| *H04B 10/67* | (2013.01) | |
| *H04B 10/69* | (2013.01) | |
| *H04B 10/118* | (2013.01) | |

(52) U.S. Cl.
CPC .......... *H04B 10/11* (2013.01); *H04B 10/118* (2013.01); *H04B 10/1121* (2013.01); *H04B 10/67* (2013.01); *H04B 10/673* (2013.01); *H04B 10/697* (2013.01); *H04B 10/6932* (2013.01)

(58) Field of Classification Search
CPC ................................... H04B 10/112
See application file for complete search history.

(56) References Cited

U.S. PATENT DOCUMENTS

| | | | |
|---|---|---|---|
| 2001/0048547 A1* | 12/2001 | Tervonen | H04B 10/291 359/349 |
| 2010/0329681 A1 | 12/2010 | Carlson et al. | |
| 2013/0039627 A1* | 2/2013 | Li | G02B 6/02042 385/126 |
| 2014/0126902 A1* | 5/2014 | Swanson | H04J 14/00 398/43 |
| 2017/0264365 A1* | 9/2017 | Takahashi | H04B 10/118 |

(Continued)

OTHER PUBLICATIONS

Arikawa et al.; Demonstration of turbulence-tolerant free-space optical communication receiver using few-mode-fiber coupling and digital combining; Conference Proceedings—2016 IEEE Photonics Society Summer Topical Meeting Series (SUM); IEEE; Jul. 11-13, 2016 (Year: 2016).*

(Continued)

*Primary Examiner* — Nathan M Cors
(74) *Attorney, Agent, or Firm* — Fleit Intellectual Property Law; Thomas S. Grzesik

(57) ABSTRACT

A free-space optical (FSO) communication system includes a transmitter including a modulated light source and transmit optics for emitting a modulated optical signal into a FS channel toward a receiver. A receiver is coupled to receive the modulated optical signal including receive optics coupled to a few-mode (FM) pre-amplifier that is coupled to a demodulator.

12 Claims, 6 Drawing Sheets

(56) References Cited

U.S. PATENT DOCUMENTS

2017/0353242 A1* 12/2017 Mansouri Rad ......... H04B 3/32

OTHER PUBLICATIONS

He Wen, Yousef Alahmadi, Patrick LiKamWa, Cen Xia, Christian Carboni, and Guifang Li; Invited Article: Four-mode semiconductor optical amplifier; APL Photonics 1, 070801 (2016); https://doi.org/10.1063/1.4955178; Published Online: Aug. 1, 2016 (Year: 2016).*

* cited by examiner

FREE-SPACE OPTICAL COMMUNICATIONS USING FEW-MODE PRE-AMPLIFIED RECEIVERS

CROSS REFERENCE TO RELATED APPLICATIONS

This application claims the benefit of Provisional Application Ser. No. 62/553,402 entitled "Free-Space Optical Communication Apparatus/System, Method, and Applications" filed Sep. 1, 2017, which is herein incorporated by reference in its entirety.

FIELD

Disclosed embodiments relate to free-space optical communications.

BACKGROUND

Free-space optical (FSO) communications is a telecommunication technology which uses light beams propagating in free-space to wirelessly transmit data between two points. "Free space" and FSO means in air, outer space, in a vacuum, or a similar medium. FSO communications is useful when physical connections are not practical due to high costs or other considerations. In addition to terrestrial point-to-point networks, FSO communications can be used for building space-based links between satellites, unmanned aerial vehicles (UAVs), high-altitude platforms (HAPS), or from satellites/UAVs/HAPS to the ground. The wavelength used can be within the visible spectrum or within the infrared spectrum.

In a typical one-way laser FSO communication system between two aerial platforms or spacecrafts or a combination of the two, laser terminals are deployed at each end, one station for transmitting and one station for receiving the optical signal including a photodetector (PD). In bi-directional optical links, a transmitter and a receiver sub-system is deployed at both sides of the link.

Although FSO communications offers an orders-of-magnitude increase in transmission capacity, while simultaneously reducing antenna size compared to that of modern radio-frequency (RF) technology, atmospheric turbulence generally distorts the wavefront, resulting in both amplitude and phase errors at the detector. Several methods to combat turbulence for FSO have been investigated including arrayed incoherent receivers, pulse-position modulation signaling with coherent arrayed receivers, and digital coherent arrays with electronic wavefront correction.

The state of the art in FSO communications is dominated by the use of adaptive optics (AO) to correct for wavefront distortions caused by atmospheric turbulence, followed by optically single-mode pre-amplified receivers. If the wavefront correction is perfect, the system can restore the ideal receiver sensitivity at 38.3 photons/bit for on-off keying (OOK) modulation. However, AO FSO systems are expensive and have large size, high weight, and high power consumption. More importantly, AO FSO systems still leave much to be desired in terms of reliability since AO does not provide perfect wavefront correction due to the limited throw, limited spatial resolution of the optics, and limited response time making such a system generally inadequate to follow rapid changes in turbulent conditions. As a result, the theoretical sensitivity limit for AO FSO systems is rarely achieved in practice.

SUMMARY

This Summary is provided to introduce a brief selection of disclosed concepts in a simplified form that are further described below in the Detailed Description including the drawings provided. This Summary is not intended to limit the claimed subject matter's scope.

This Disclosure recognizes since reliability is a key impediment to widespread adoption of FSO communication systems, it is desirable to develop new solutions to solve the problems of FSO communication systems caused by turbulence, and also to improve FSO system reliability. A distorted wavefront is a superposition of the fundamental spatial mode (Gaussian) and high-order modes (e.g. Hermite-Gaussian). If photons in all of the modes in a distorted wavefront are detected and the photocurrent due to photons in all modes are summed up constructively, wavefront correction becomes dispensable. Although a multimode (MM) PD can readily detect photons in all of the modes of a distorted wavefront, the sensitivity for the MMPD will be thermal noise limited at about 1,000s photons/bit for OOK modulation.

Disclosed aspects solve this problem by providing a turbulence-tolerant FSO communication system that includes a transmitter including a modulated light source and transmit optics for emitting a modulated optical signal into a FS channel toward a receiver. A receiver is coupled to receive the modulated optical signal including receive optics coupled to a few-mode (FM) pre-amplifier that is coupled to a demodulator.

As used herein FM refers to 2 to up to 150 spatial modes, such as 2 to 20 modes. In comparison to known FSO systems that have a single-mode pre-amplified receiver, disclosed FM pre-amplified receiver-based FSO systems can achieve much better transmission performance in terms of the bit-error ratio (BER) with the same power budget, or alternatively, for the same BER provide an increased power budget or reduce the transmitter power over a conventional single-mode FSO system under the same conditions.

BRIEF DESCRIPTION OF THE DRAWINGS

Reference will now be made to the accompanying drawings, which are not necessarily drawn to scale, wherein.

DETAILED DESCRIPTION

Figure 1:
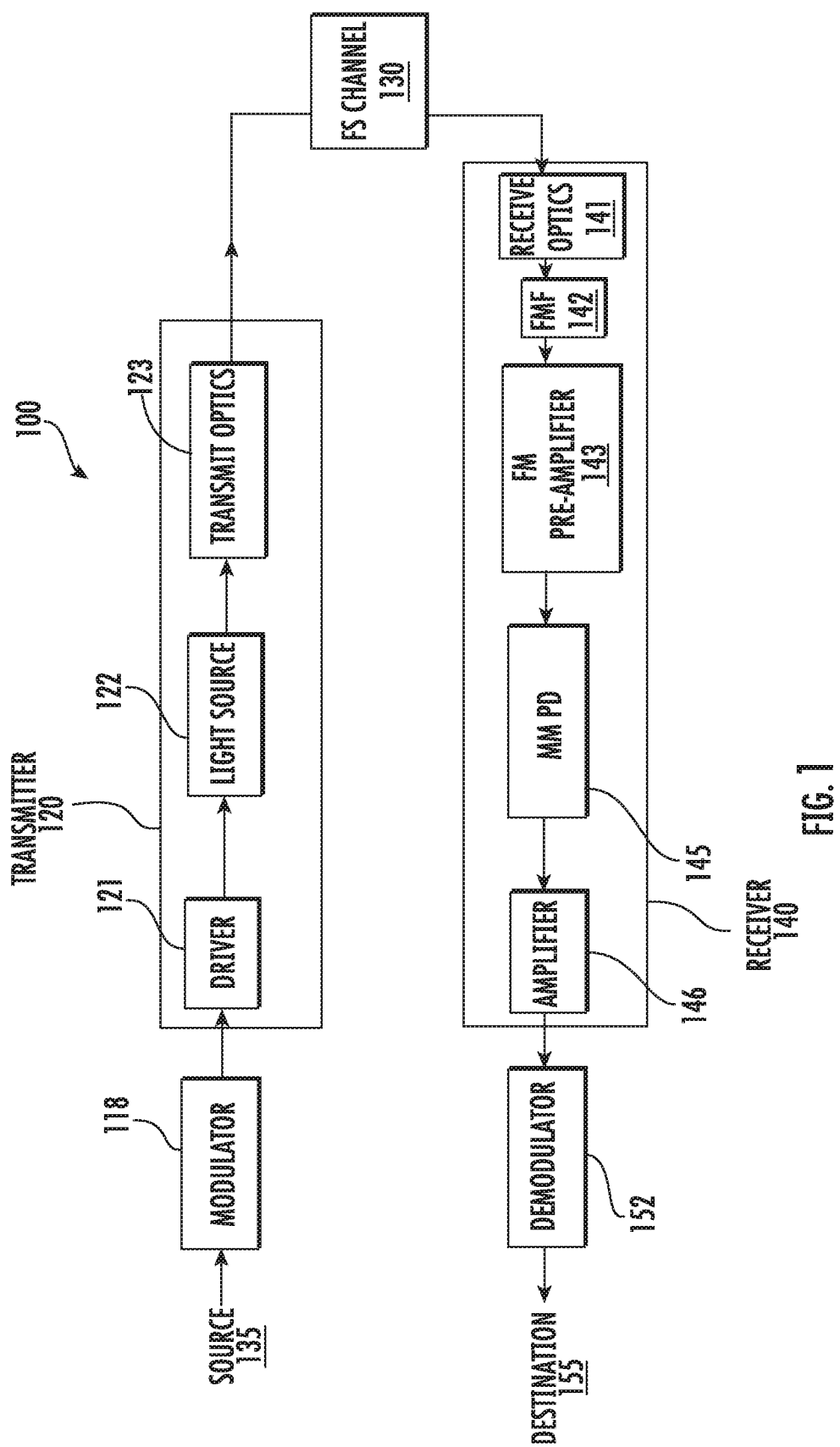
FIG. 1 is a schematic of a disclosed FSO communication system including a FM pre-amplified receiver that comprises a FM fiber amplifier and a MMPD, according to an example embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed turbulence-tolerant FSO communication systems include a FM pre-amplified receiver that comprises a few-mode fiber (FMF) amplifier, such as an EDFA, and a MMPD. FIG. 1 is a schematic of a disclosed FSO communication system 100 including a FM pre-amplified receiver (receiver) 140 that comprises receive optics 141 (e.g., a lens system), a FMF 142, a FM pre-amplifier 143, and a MMPD 145.

The FSO communication system 100 also includes a transmitter 120 or multiple transmitters operating at different wavelengths, communicating over the FS channel 130 with the receiver 140. In general, the FS channel 130 is turbulent as a result of spatial inhomogeneities in the temperature and in the pressure of the atmosphere, which lead to transverse and longitudinal variations of the refractive index of the atmosphere. Instead of the conventional approach of using AO to correct wavefront distortion, disclosed FSO communication systems use a FM pre-amplified receiver to convert the photons in all the modes into electrons. A FMF 142, such as a 10-mode graded-index (GI) fiber, is used to collect the light from the receive optics 141 instead of a conventional single-mode fiber (SMF). The collected signal is then amplified by the FM pre-amplifier 143, such as a cladding-pumped FM amplifier, before the signal goes to a the MMPD 145, then to an amplifier 146 (e.g., an operational amplifier) for amplifying the electrical signal, which is coupled to a demodulator 152 at the destination 155 of the FSO communication system 100.

The transmitter 120 includes a light source 122 such as a laser diode driven by a driver 121 that receives a modulation signal from a modulator 118 at the source 135 of the FSO communication system 100. The light source 122 is coupled to transmit optics 123, such as a lens system, for emitting a modulated light beam toward the receiver 140 over the FS channel 130, where the modulated light beam typically comprises infrared laser light. The light source 122 may also comprise light emitting diodes (LEDs), or another type of light source.

For experiments performed the turbulence was laboratory generated. For FS propagation distances within a few kilometers, intensity variation is typically much less than the phase variation. Thus, the turbulence can be simulated by a phase plate with appropriate randomness. The strength of the turbulence can be characterized by a phase structure function D(r), which describes the mean squared phase variations at different locations as defined by:

$$D(r) = \langle (\varphi(\vec{r}) - \varphi(\vec{r} + \vec{r'}))^2 \rangle \quad (1)$$

where φ denotes the local phase. In the sense of Kolmogorov turbulence, the phase structure function D is a function of the coherence length $r_0$ shown as D(r):

$$D(r) = 6.88(r/r_0)^{5/3} \quad (2)$$

The wavenumber (k) spectral density is:

$$\Phi(k) = 0.023 r_0^{-5/3} k^{-11/3} \quad (3)$$

Phase variation was emulated in experiments performed using phase plates created by repeatedly spray coating glass substrates. The phase distribution was measured using a phase-shifting interferometer, in which the optical path difference was achieved by applying different voltages to a liquid crystal cell. The phase structure function can be calculated by Eq. (1). The coherence length was calculated to be 5 mm. The total wavefront distortion within a 6.3 mm aperture of the interferometer is approximately ±π (pi).

Figure 2A:
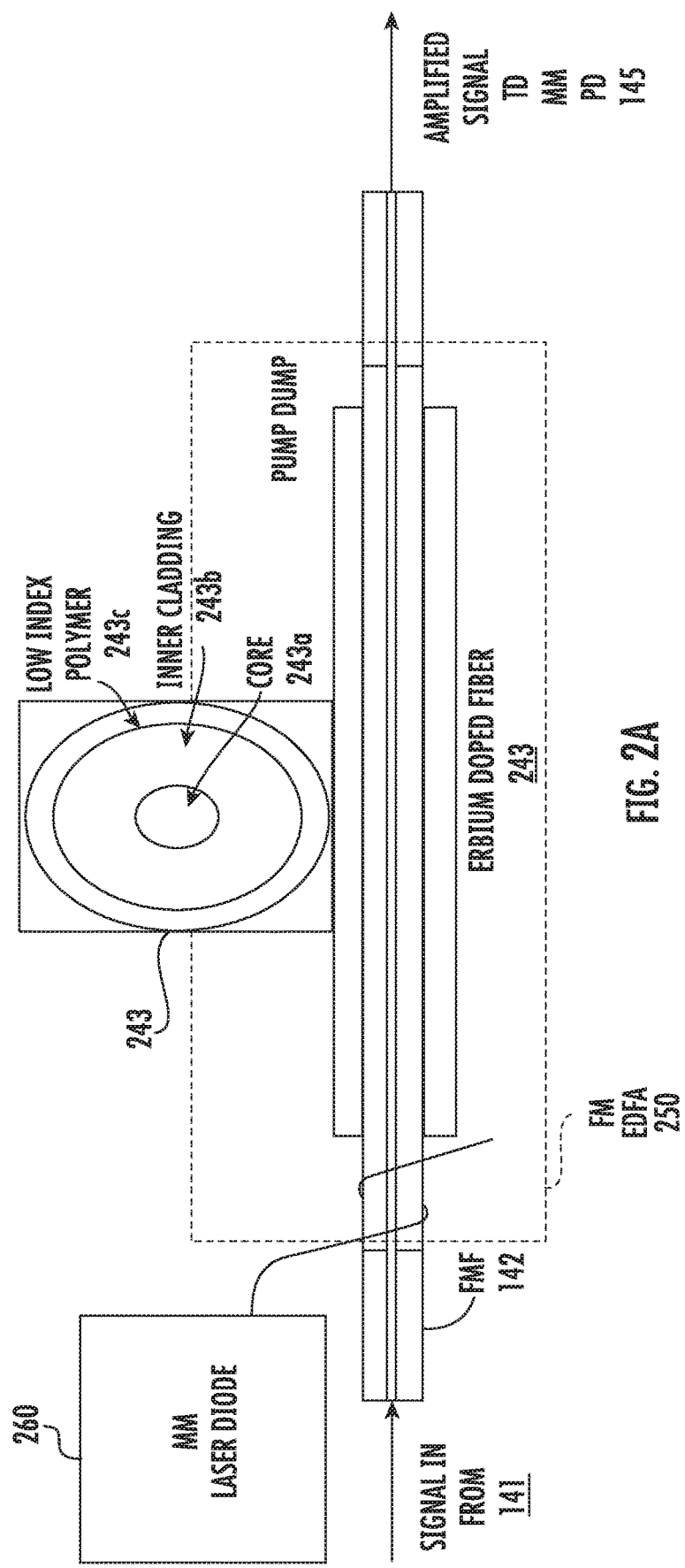
FIG. 2A is a schematic of a FM pre-amplifier comprising a FM erbium-doped fiber amplifier (EDFA).

Regarding the FM pre-amplifier 143, a low noise figure (NF) and low MDG is important for the pre-amplified FM receiver 140. A cladding-pumped FM amplifier with an EDF of core diameter 26 am was built which can support 42 spatial modes. FIG. 2A is a schematic of a FM pre-amplifier comprising a FM EDFA shown as 250 that is generally spliced to a FMF 142. The FM EDF 243 has two cladding layers, an outer cladding layer 243c shown as a low index polymer having a lower refractive index and an inner cladding layer 243b having higher refractive index that surrounds a fiber core 243a, typically being a silica core. Pump light coming from a light source functioning as a pump source shown as a MM laser diode (MMLD) 260 is coupled into the inner cladding 243b of the EDF 243 through side pumping.

Figure 2B:
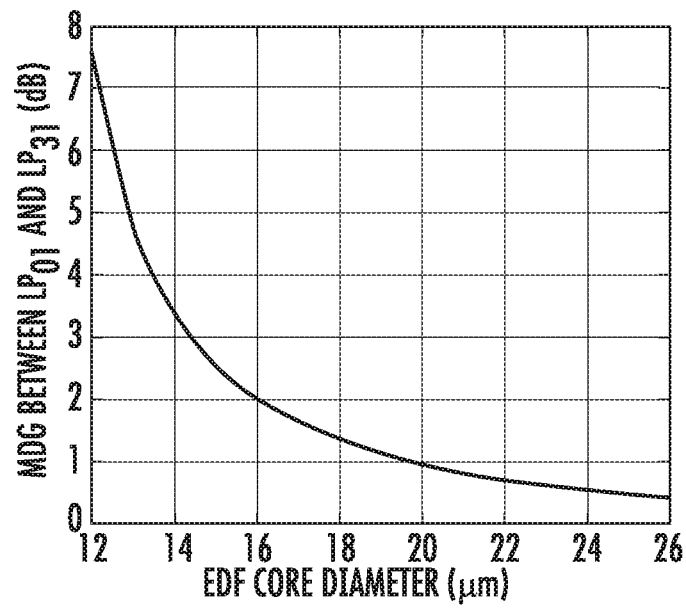
FIG. 2B shows the mode-dependent gain (MDG) between the lowest-order mode ($LP_{01}$) and the highest-order mode ($LP_{31}$) in dbs vs. the EDF core diameter.
Figure 2C:
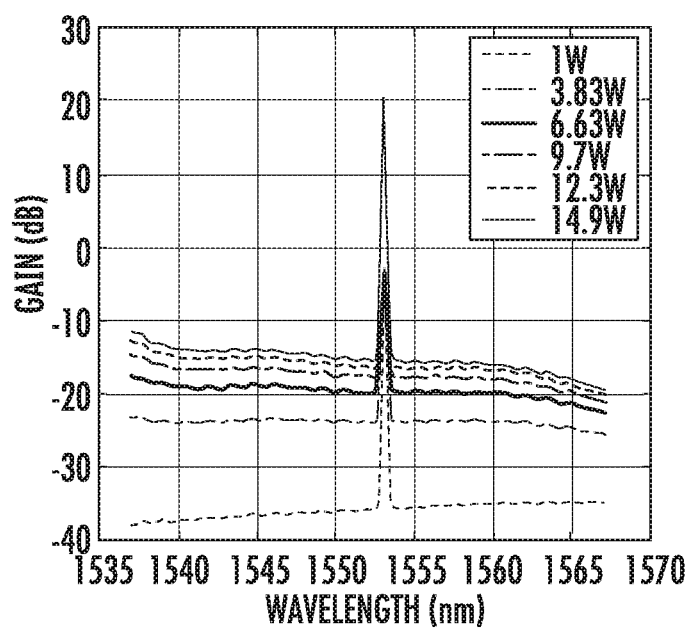
FIG. 2C shows a gain characterization of the $LP_{01}$ mode for the EDFA at different pump powers for an input power of −12 dBm.
Figure 2D:
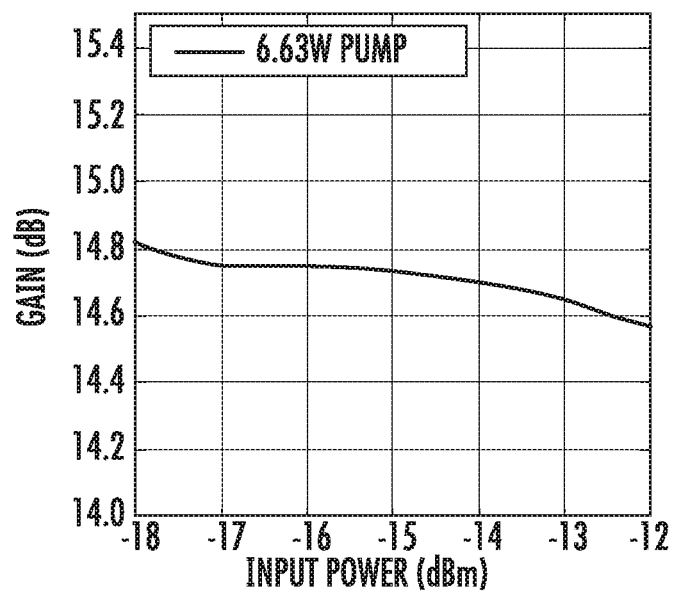
FIG. 2D shows a gain characterization of the $LP_{01}$ mode for the EDFA at 1553 nm in a range of different input powers.

To realize side pumping, the MMF pigtail of the MMLD 260 was spliced to a coreless fiber which was down tapered from 125 μm to 20 μm with a tapered length of 30 mm. Then, the tapered coreless fiber was wrapped 1.5 turns around the 2 m EDF 243. The small-signal gain was 10.5 dB/m. Since the intensity overlap of the 10 spatial modes of the input signal with the MMLD 260 is approximately the same, the MDG was greatly reduced. The simulation results shown in FIG. 2B shows that when the EDF 243 ore diameter increases, the small-signal MDG for the EDFA 250 can be reduced to less than 0.5 dB. FIGS. 2C and 2D show the gain characterization of the $LP_{01}$ mode for the EDFA 250 at different MMLD 260 pump power and input power, respectively.

Figure 3A:
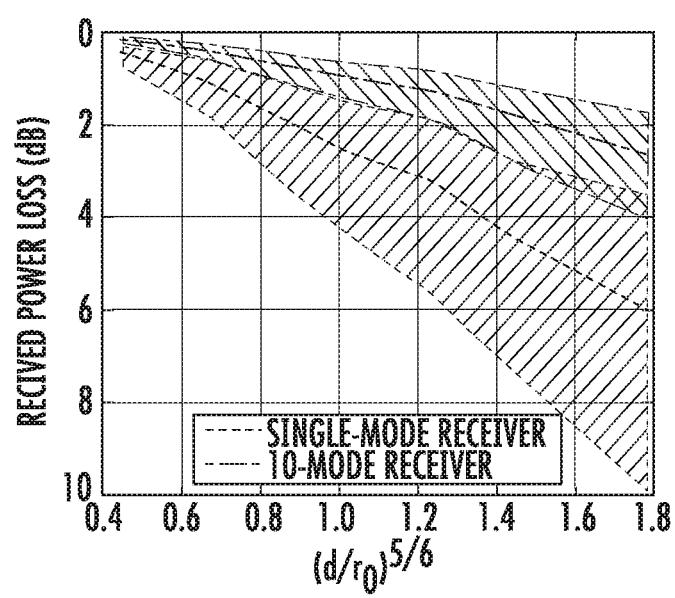
FIG. 3A shows received power loss at different phase variations.

To evaluate advantages of using disclosed FM pre-amplified receivers, phase plates representing various turbulence levels were generated based on Eq. (3) shown above, with each turbulence level having 500 statistically independent realizations. The turbulence-induced power loss was simulated for both a disclosed 10-mode receiver and the known single-mode receiver, as shown in FIG. 3A. The term $(d/r_0)^{5/6}$ on the x-axis is a measure of phase variation and d is the aperture size (1 cm in the simulation performed). The average losses are represented by solid lines. The shaded region represents the power variation for different realizations of each turbulence condition. It is observed that the average loss and received power fluctuation for the 10-mode pre-amplified receiver are much smaller than for the conventional SM receiver. Inclusion of more modes will improve the performance in this regard further.

Figure 3B:
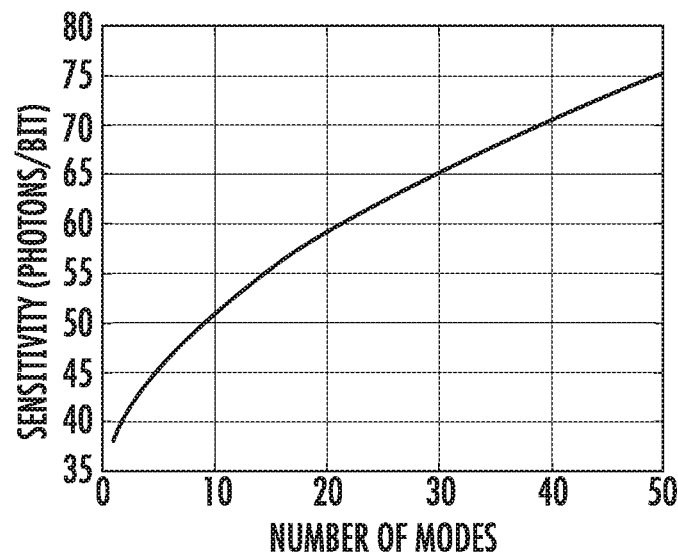
FIG. 3B shows the sensitivity of a few-mode pre-amplified OOK receiver as a function of the number of modes.

However, the sensitivity of the FM pre-amplified OOK receiver decreases as the number of modes increases. This is because of the increase in the degrees of freedom of the spontaneous emission noise. Assuming that each mode has equal gain and noise figure, the FM pre-amplified receiver's sensitivity as a function of the number of modes in the distorted wavefront is shown in FIG. 3B. Fortunately, the sensitivity increases slowly as the number of modes increases, leading to a sensitivity penalty of only 1.2 dB when using 10 modes and a penalty of 3 dB when using 50 modes.

The FM pre-amplifier 143 need not be limited to an EDFA. A semiconductor optical amplifier (SOA) may also be used. Although a 10 mode graded index (GI) fiber is disclosed as the FMF 142, it will be appreciated that in regards to the number of modes for the amplifier and the fiber, there can be a process in which the number of modes will increase as the turbulence gets stronger. A technical goal in this case is to expand the distorted wavefront into spatial modes and amplify any of the spatial modes that have significant power so that the number of modes will increase as the turbulence gets stronger.

In another aspect, the gain of each spatial mode will be different. The gain of each mode can be proportional to the input power of the modes of the distorted wavefront, referred to as maximum-ratio combining. In order to do so, the incoming distorted wavefront will be split into two paths, similar to a FSO receiver using AO, where one path is directed toward a disclosed FM pre-amplified receiver and the other path is directed toward a mode power analyzer. Such a mode power analyzer can comprise a mode demultiplexer, such as a photonic lantern or a multi-plane light converter, and a power meter. The modal power content provided by the mode power analyzer is used as a feedback control for the modal gains of the FM pre-amplifier.

In an aspect, the pre-amplified FM receiver is compatible with AO, for those cases where single-mode receiver plus AO cannot compensate the wavefront distortion completely. In this case, the SM pre-amplified receiver in the traditional AO system is replaced by a disclosed FM pre-amplified receiver that includes AO in front of the FM pre-amplifier. In this case, even if the AO does not fully correct the wavefront distortion, the disclosed FM pre-amplified receiver is still able to efficiently receive the slightly-distorted wavefront after an imperfect AO.

EXAMPLES

Disclosed embodiments are further illustrated by the following specific Examples, which should not be construed as limiting the scope or content of this Disclosure in any way.

Figure 3C:
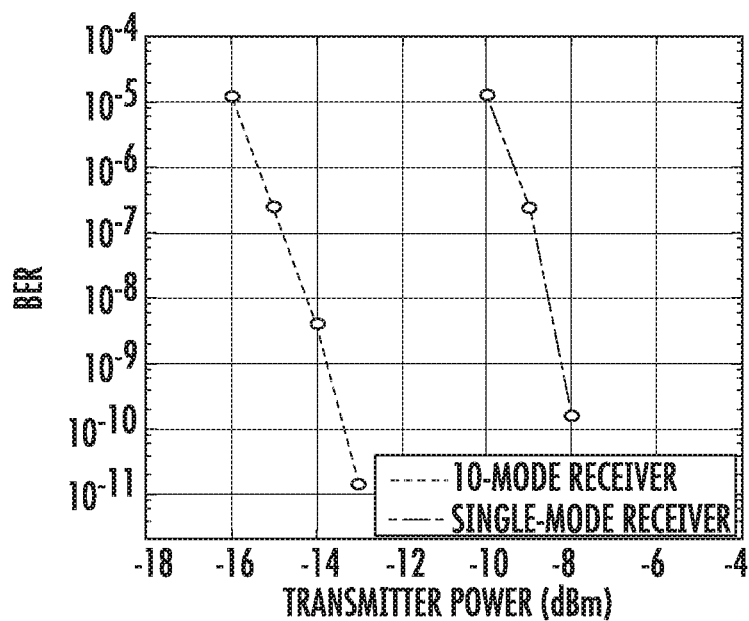
FIG. 3C shows the BERs for a disclosed 10-mode pre-amplified receiver and a conventional single-mode pre-amplified receiver vs transmitter power.

In a FSO transmission experiment, a 10 GHz OOK signal from a SM transmitter was expanded into a beam of diameter around 1 cm. With a coherence length of 5 mm, the phase variation across the beam was scaled by $(d/r_0)^{5/6}$ to $\pm 2\pi$. The pump power for the disclosed FM pre-amplifier was 6.63 W, which provides a ~15 dB gain as shown in FIG. 2C. The BER was measured at different transmitter power levels as shown in FIG. 3C. As a comparison, BERs using a conventional single-mode pre-amplifier with the same gain were also measured. The comparison shows a disclosed 10-mode pre-amplified receiver can provide a 6 dB increase in power budget over a conventional SM pre-amplified receiver.

Figure 4:
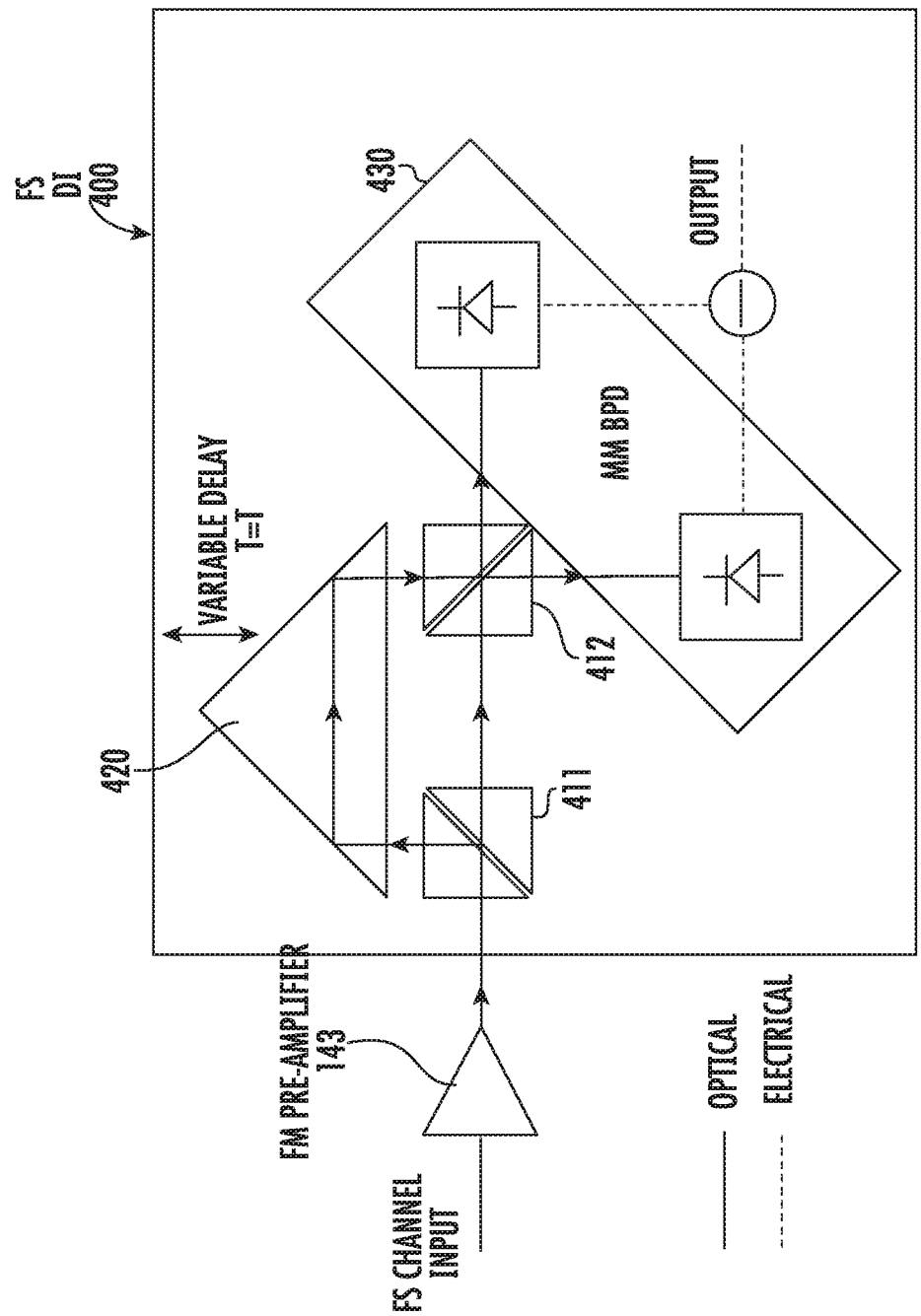
FIG. 4 is the schematic of an example delayed interferometer in FS form for implementing differential phase-shift keying modulation.

It should be noted that a disclosed FM pre-amplified receiver for OOK can be extended to using differential phase-shift keying (DPSK) modulation. In order for the DPSK demodulator to function properly for all of the spatial modes, a delayed interferometer (DI) is constructed in FS as shown by the example FS delayed interferometer 400 in FIG. 4 (shown as a FS DI) which identifies its optical and electrical portions. The FS DI 400 comprises first and second beam splitters (BS) 411, 412 with a 50:50 splitting ratio used together with a prism 420, where the FS channel input shown is amplified by a disclosed FM pre-amplifier 143 that is coupled to BS 411 which is coupled to BS 412. The time delay between the upper- and lower arms of the DI 400 can be adjusted by translating the prism 420. The perfect time delay is a bit slot. The two outputs from BS 412 for the DI 400 are detected by a MM BPD 430, which offers better performance in terms of signal-to-noise ratio (SNR) as compared to a single-ended PD. The outputs of MM BPD 430 are subtracted from one another to recover the intended signal.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The invention claimed is:

1. A free-space optical (FSO) communication system, comprising:
    a transmitter including a modulated light source and transmit optics for emitting a modulated optical signal into a free-space (FS) channel toward a receiver; and
    a receiver coupled to receive the modulated optical signal comprising receive optics coupled to a few-mode (FM) pre-amplifier, wherein an output of the FM pre-amplifier is coupled to a multimode (MM) photodetector (PD),
    wherein the output of the FM pre-amplifier is coupled to the MM PD by an optical demodulator, and wherein the modulated light source includes a differential phase-shift keying (DPSK) modulator so that the modulated optical signal is a DPSK modulated signal.

2. The FSO communication system of claim 1, wherein the receiver is coupled by a few-mode fiber (FMF) to receive the modulated optical signal from the receive optics.

3. The FSO communication system of claim 2, wherein the FMF comprises a graded index (GI) fiber.

4. The FSO communication system of claim 1, wherein the FM pre-amplifier comprises a FM fiber amplifier.

5. The FSO communication system of claim 4, wherein the FM fiber amplifier comprises an erbium-doped fiber amplifier.

6. The FSO communication system of claim 1, wherein the FM pre-amplifier comprises a semiconductor optical amplifier.

7. The FSO communication system of claim 1, wherein the modulated light source comprises an infrared laser light source.

8. The FSO communication system of claim 1, wherein the receiver includes adaptive optics in front of the FM pre-amplifier.

9. An optical receiver, comprising:
   receive optics for receiving a modulated optical signal including a few-mode (FM) fiber (FMF); and
   a FM pre-amplifier having an input coupled to an output of the FMF and an output coupled to a multimode (MM) photodetector PD,
   wherein the output of the FM pre-amplifier is coupled to the MM PD by an optical demodulator, and wherein the modulated optical signal is a DPSK modulated signal.

10. A method for communicating in a free-space optical (FSO) communication system, comprising:
    transmitting a modulated optical signal into a free-space (FS) channel toward a receiver using a transmitter including a modulated light source and transmit optics; and
    receiving the modulated optical signal using the receiver including receive optics that is coupled to a few-mode (FM) pre-amplifier, wherein an output of the FM pre-amplifier is coupled to a multimode (MM) photodetector (PD),
    wherein an output of the FM pre-amplifier is coupled to the MM PD by an optical demodulator, and wherein the modulated light source includes a differential phase-shift keying (DPSK) modulator so that the modulated optical signal is a DPSK modulated signal.

11. The method of claim 10, wherein the FM pre-amplifier comprises an erbium-doped fiber amplifier.

12. The method of claim 10, wherein the receiver includes adaptive optics in front of the FM pre-amplifier, further comprises correcting for receiving the modulated optical signal for wavefront distortions.

* * * * *